May 21, 1968 K. IKRATH ETAL 3,384,811
MEASUREMENT OF ELECTRICAL EARTH CURRENTS BY SEISMIC
WAVE MODULATION THEREOF
Filed Oct. 3, 1966
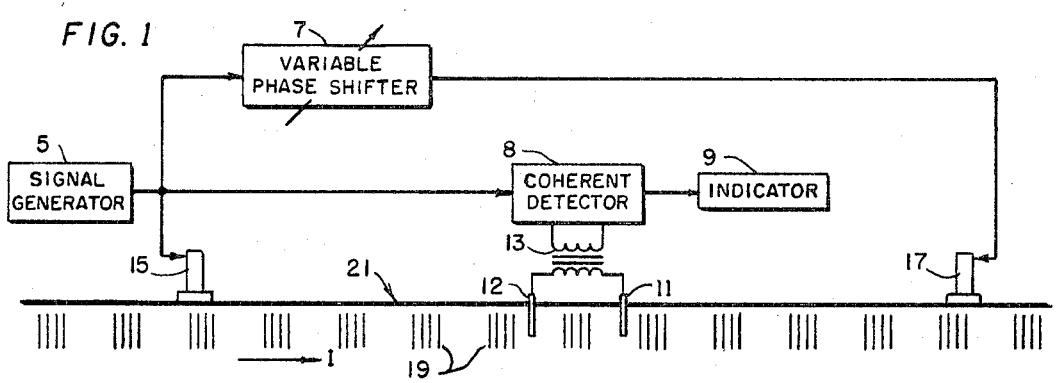
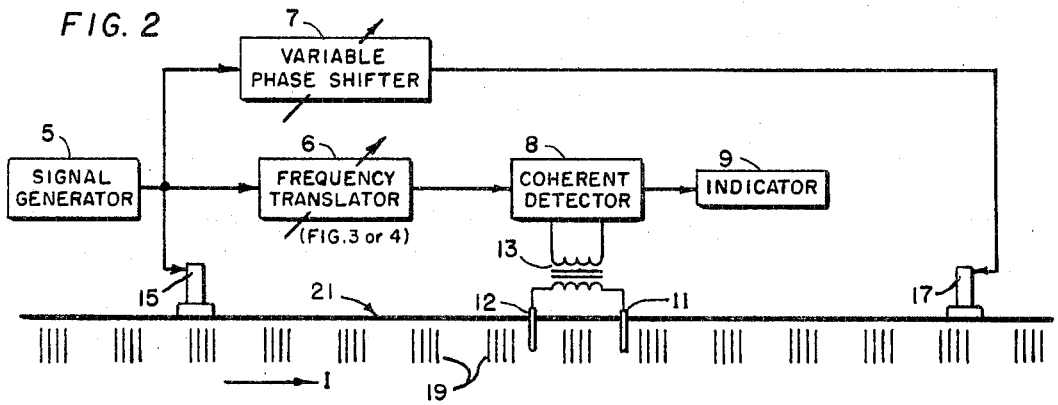
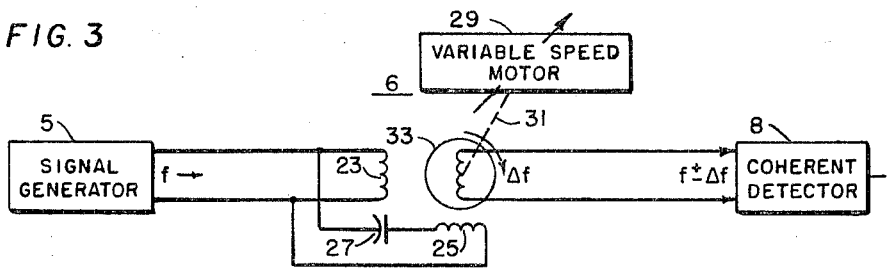
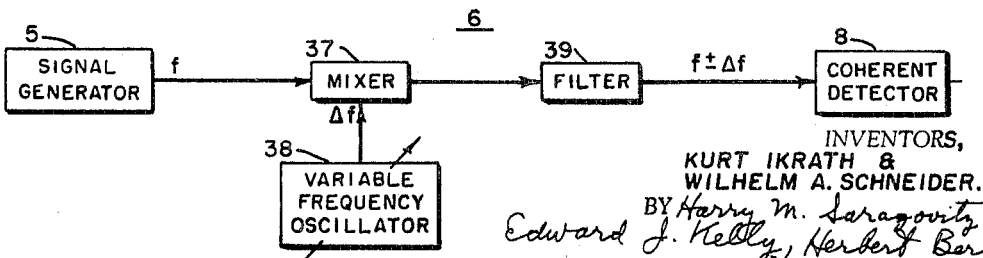
INVENTORS,
KURT IKRATH &
WILHELM A. SCHNEIDER.

3,384,811
MEASUREMENT OF ELECTRICAL EARTH CURRENTS BY SEISMIC WAVE MODULATION THEREOF
Kurt Ikrath, Elberon, and Wilhelm A. Schneider, Fair Haven, N.J., assignors to the United States of America as represented by the Secretary of the Army
Filed Oct. 3, 1966, Ser. No. 584,025
6 Claims. (Cl. 324—1)

ABSTRACT OF THE DISCLOSURE

The apparatus includes means for setting up a standing seismic wave in a portion of earth in which it is desired to measure the electrical current. A pair of electrodes is located at two nodes of the standing wave. The earth current picked up by the electrodes will be modulated at the frequency of the seismic standing wave and the same alternating current generator which produced the seismic wave is used to coherently demodulate the electrode current. By heterodyning the generator in frequency, any alternating current frequency component of earth current may be coherently detected.

---

The invention described herein may be manufactured, used, and licensed by or for the Government for governmental purposes without the payment to us of any royalty thereon.

The present invention relates to methods and apparatus for the measurement of electrical currents flowing within the earth and more particularly to improved methods and means for accomplishing selective measurement of earth currents of any selected frequency, including direct current, with great accuracy. The novel technique involves the setting up within the earth of standing seismic waves which modulate the resistivity of the earth at the seismic wave frequency and hence also modulate any earth currents flowing therein. Means are provided for deriving a voltage from the earth proportional to these modulated currents therein, and this voltage is coherently detected by using a reference signal one of the modulation products of the seismic wave frequency and the selected frequency of the earth current which it is desired to measure. This technique provides accurate measurement of the selected frequency component of each current, including direct earth currents, without interference from other frequency components or noise.

It is thus an object of this invention to provide improved methods and means for measuring electrical earth current.

Another object of the invention is to provide a new technique for measuring electrical earth currents by modulating the earth currents with standing seismic waves and coherently detecting the modulated earth currents.

A further object of the invention is to provide a method and means for accurately measuring earth currents of any selected frequency.

These and other objects and advantages of the invention will become apparent from the following detailed description and drawing in which:

FIGURE 1 is a diagram illustrating a technique for measuring direct earth currents and FIGURE 2 a technique for measuring alternating electrical earth currents of any selected frequency. FIGURES 3 and 4 are diagrams of frequency translators which may be used with the embodiment of FIGURE 2.

Referring first to FIGURE 1, there is shown in a sinusoidal signal generator 5 the output of which is connected to a first seismic transducer 15 and to a second similar transducer 17 via a variable phase shifter 7. The transducers 15 and 17 convert the electrical signals applied thereto to mechanical vibrations of corresponding frequency and couple the vibrations to the earth as seismic waves. Both transducers rest on the surface of the earth 21 and both launch seismic waves toward each other which combine to form a standing seismic wave pattern between the two transducers, as indicated at 19. The crests or anti-nodes of the wave pattern are indicated as groups of four vertical lines with the nodes midway between. A pair of conducting electrodes 11 and 12 are driven into the earth between the two transducers and are positioned at adjacent nodes of the wave pattern and are thus spaced by one half of a seismic wavelength. The standing wave pattern can be moved either to the right or left by adjustment of the variable phase shifter 7 to achieve the desired positioning of the nodes relative to the electrodes. Such movement will shift the positions of the nodes and anti-nodes in unison however will not affect the wavelength. With this arrangement, there will be antinode or place of maximum displacement midway between the two electrodes, and the earth between the electrodes will be alternatively compressed and rarefied at the frequency of the signal generator 5. The resistivity of the earth will undergo similar variations due to its compression rarefaction and will cause any currents, I, flowing parallel to the surface in the region to be amplitude modulated. By locating the electrodes at the nodes of the standing wave pattern there will be no vibration of the earth which contacts the electrodes. Any vibration at these points would vary the contact resistance and cause inaccuracy in the measurement of the earth currents. It would be possible to get the same resistivity modulation between electrodes spaced by any odd number of half wavelengths, however it has been found preferable to locate the electrodes at the minimum spacing of one half of a seismic wavelength.

Thus a DC current I flowing in the earth past the electrodes will produce an alternating current voltage at the frequency of generator 5 between the electrodes 11 and 12. This voltage is applied to coherent detector 8 via matching and step up transformer 13 where it is coherently detected using the output of signal generator 5 as a reference. The DC component in the output of detector 8, shown on indicator 9, is proportional to the magnitude of the DC earth current. It should be noted that alternating current components of the earth current will produce, by heterodyning action within the detector 8, modulation products which will differ from the frequency of signal generator 5 and hence these will produce no DC output on indicator 9. Likewise, noise or transient earth currents, being special cases of alternating current signals, will not be indicated by the apparatus of FIGURE 1. The result is an accurate measurement of DC earth current. The apparatus in effect heterodynes the DC earth current up in frequency to that of generator 5, and thus permits it to be coherently detected with great accuracy and discrimination against other frequency components.

By translating the frequency of the reference signal from the signal generator 5 before it is applied to the coherent detector, any alternating frequency component of the earth current can be selectively and separately measured. This technique is illustrated in FIGURE 2, which is the same as FIGURE 1 except that an adjustable frequency translator 6 is connected between the output of generator 5 and coherent detector 8. The reference signal input to the coherent detector can be shifted in frequency by any desired amount by adjustment of the frequency translator 6. In practice this can be accomplished by heterodyning the output of signal generator 5 with the output of a variable frequency oscillator and selecting one of the modulation products thereof as the input to coherent detector 8. The voltage applied to detector 8 from the electrodes 11 and 12 will contain components at the frequency of signal generator 5 as well as sidebands thereof which differ from the frequency of generator 5 by the frequency of any alternating current components of the earth current flowing between the electrodes. The coherent detector however will respond only to the sideband which is at the frequency of the output of the frequency translator 6 and the DC output indicated at 9 will be proportional to the amplitude of this sideband which in turn is proportional to the amplitude of the alternating earth current component which produced the sideband. Earth currents of other frequencies including DC earth currents will produce no DC output at indicator 9. Thus if it is desired to measure the amplitude of any component of the earth current, the frequency translator is adjusted to produce an output frequency which differs from that of the output of generator 5 by the frequency of the component of earth current which it is desired to measure. It can be seen that the circuit of FIGURE 1 is merely a special case of that of FIGURE 2 if the DC component is considered as zero frequency.

The adjustable frequency translator 6 of FIGURE 2 may take several forms, two of which are illustrated in FIGURES 3 and 4. In FIGURE 3 the frequency translator 6 comprises a two phase, wound-rotor induction machine with stator coils 23 and 25 arranged in space quadrature. This type of machine is frequently used as a servo motor or resolver. The output of signal generator 5 is applied directly to one stator winding 23 and to the other stator winding 25 via phase shifting capacitor 27. This sets up a rotating magnetic field in the rotor 33. The speed of rotation of the magnetic field will be $f$ cycles or revolutions per second, where $f$ is the frequency of generator 5 in c.p.s. If the rotor 33 of the machine is then rotated by external means, the frequency of the voltage induced in the motor will differ from that of the stator windings by the rotation frequency of the rotor. For example, if the rotor is rotated at $\Delta f$ revolutions per second, the rotor winding frequency would be either $f+\Delta f$ or $f-\Delta f$, depending on the direction of rotation relative to the rotating magnetic field. The variable speed motor 29 would be adjusted so that $\Delta f$ equals the frequency of the component of earth current which it is desired to measure.

The frequency translator 6 of FIGURE 4 comprises a heterodyne mixer 37 to which the outputs of signal generator 5 and variable frequency oscillator 38 are applied. The filter 39 selects one of the modulation products from the mixer output, either $f+\Delta f$ or $f-\Delta f$, where $f$ is the frequency of signal generator 5 and $\Delta f$ the frequency of oscillator 38, and applies this signal to detector 8 as the reference input thereof. The frequency $\Delta f$ of oscillator 38 is set at the frequency at which it is desired to measure the earth current.

While the invention has been described in connection with illustrative embodiments the principles thereof are of general application and hence the invention should be limited only by the scope of the appended claims.

What is claimed is:

1. A method of measuring earth currents at any selected frequency comprising the steps of setting up a standing seismic wave pattern within the earth, thereby modulating said earth currents at the frequency of said standing seismic waves and coherently detecting said earth currents of said selected frequency by utilizing as a reference signal one of the modulation products of the frequency of said seismic standing wave and said selected frequency.

2. Apparatus for measuring direct earth currents comprising, a pair of seismic transducers located at spaced points on the earth's surface, a sinusoidal signal generator connected to said transducers, whereby a standing seismic wave pattern is set up in the earth between said transducers, a pair of conductive electrodes driven into the earth between said transducers, said electrodes being located at adjacent nodes of said standing wave pattern, a coherent detector, means to apply the voltage developed between said electrodes to said coherent detector as the signal input thereof and means to apply the output of said sinusoidal signal generator to said coherent detector as the reference input thereof, and an indicator connected to said coherent detector to indicate the direct current component in the output thereof.

3. The apparatus of claim 2 wherein said sinusoidal signal generator is connected directly to one of said seismic transducers and to the other of said transducers via a variable phase shifter.

4. Apparatus for measuring a selected frequency component of the earth electrical current comprising, a pair of seismic transducers located at spaced points on the earth's surface, a sinusoidal signal generator connected to said transducers, whereby a standing seismic wave pattern is set up in the earth between said transducers, a pair of conductive electrodes driven into the earth between said transducers, said electrodes being located at adjacent nodes of said standing wave pattern, a coherent detector, means to apply the voltage developed between said electrodes to said coherent detector as the signal input thereof, an adjustable frequency translator connected to the output of said sinusoidal signal generator, the output of said frequency translator comprising the reference input of said coherent detector, said frequency translator being adjusted to translate the frequency of said sinusoidal signal generator by an amount equal to the frequency of said selected frequency component of the earth electrical current, and an indicator connected to said coherent detector to indicate the direct current component in the output thereof.

5. The apparatus of claim 4 wherein said frequency translator comprises a two phase, wound-rotor induction machine comprising a pair of stator windings and a rotor winding, and wherein the output of said sinusoidal signal generator is applied directly to one of said stator windings and via phase shifting means to the other of said stator windings, and means to rotate said machine at a speed proportional to the frequency of said selected frequency component of the earth electrical current; the rotor winding voltage comprising the output of said frequency translator.

6. The apparatus of claim 4 wherein said frequency translator comprises a heterodyne mixer having as one input the output of said sinusoidal signal generator and as the other input the output of a variable frequency oscillator, filter means connected to the output of the modulation products thereof, the output of said filter means comprising the output of said frequency translator, the frequency of said variable frequency oscillator being adjusted to the frequency of said selected frequency component of the earth electrical current.

References Cited

UNITED STATES PATENTS

| | | | |
|---|---|---|---|
| 2,054,067 | 9/1936 | Blau et al. | 324—1 XR |
| 2,104,440 | 1/1938 | Statham et al. | 324—1 |
| 2,156,259 | 5/1939 | Blau | 324—1 XR |
| 2,288,310 | 6/1942 | Zuschlag | 324—1 XR |
| 2,657,380 | 10/1953 | Donaldson | 324—6 XR |
| 2,690,537 | 9/1954 | Weiss et al. | 324—6 XR |
| 3,302,745 | 2/1967 | Ikrath | 181—.5 |

RUDOLPH V. ROLINEC, *Primary Examiner.*

G. R. STRECKER, *Assistant Examiner.*